United States Patent
Jiang

(10) Patent No.: US 12,432,764 B2
(45) Date of Patent: Sep. 30, 2025

(54) METHOD FOR IN-DEVICE COEXISTENCE INTERFERENCE INDICATION AND METHOD AND APPARATUS FOR IN-DEVICE COEXISTENCE INTERFERENCE RECEIVING

(71) Applicant: XIAOMI COMMUNICATIONS CO., LTD., Beijing (CN)

(72) Inventor: Xiaowei Jiang, Beijing (CN)

(73) Assignee: XIAOMI COMMUNICATIONS CO., LTD., Beijing (CN)

(*) Notice: Subject to any disclaimer, the term of this patent is extended or adjusted under 35 U.S.C. 154(b) by 812 days.

(21) Appl. No.: 17/628,538

(22) PCT Filed: Jul. 19, 2019

(86) PCT No.: PCT/CN2019/096868
§ 371 (c)(1),
(2) Date: Jan. 19, 2022

(87) PCT Pub. No.: WO2021/012109
PCT Pub. Date: Jan. 28, 2021

(65) Prior Publication Data
US 2022/0256546 A1    Aug. 11, 2022

(51) Int. Cl.
*H04W 72/541* (2023.01)
*H04W 24/10* (2009.01)
(Continued)

(52) U.S. Cl.
CPC ......... *H04W 72/541* (2023.01); *H04W 24/10* (2013.01); *H04W 72/0453* (2013.01); *H04W 72/23* (2023.01); *H04W 76/18* (2018.02)

(58) Field of Classification Search
CPC .............. H04W 72/541; H04W 24/10; H04W 72/0453; H04W 72/23; H04W 76/18; H04W 76/19; H04W 76/27; H04W 16/14; H04W 36/0011; H04W 36/0055; H04W 76/34; H04W 76/16
See application file for complete search history.

(56) References Cited

U.S. PATENT DOCUMENTS 9,167,483 B2 * 10/2015 Jang .................. H04W 72/21
9,872,211 B2 *  1/2018 Jang .................. H04W 72/21
(Continued)

FOREIGN PATENT DOCUMENTS

CN      101557619 A     10/2009
CN      102378192 A      3/2012
(Continued)

OTHER PUBLICATIONS

International Search Report of PCT/CN2019/096868 dated Apr. 17, 2020 with English translation, (4p).
(Continued)

*Primary Examiner* — Brian T O Connor
(74) *Attorney, Agent, or Firm* — Arch & Lake LLP

(57) ABSTRACT

A method for in-device coexistence interference indication, applicable to a terminal. The method comprises: when a terminal is in an idle state or inactive state, determining that in-device coexistence interference (DC) has occurred or is to occur in the terminal; and sending DC indication information to a base station.

18 Claims, 11 Drawing Sheets determining, when the terminal is in an idle state or an inactive state, that in-device coexistence interference IDC exists or is about to occur in the terminal — S1 determining whether in-device coexistence interference IDC existing or being about to occur in the terminal is caused by a hardware sharing problem — S9 sending IDC indication information to the base station if IDC is caused by the hardware sharing problem — S2

(51) Int. Cl.
*H04W 72/0453* (2023.01)
*H04W 72/23* (2023.01)
*H04W 76/18* (2018.01)

(56) References Cited

U.S. PATENT DOCUMENTS

| | | | |
|---|---|---|---|
| 11,089,493 B2* | 8/2021 | Baghel | H04W 24/02 |
| 11,129,239 B2* | 9/2021 | Liu | H04W 76/16 |
| 11,330,652 B2* | 5/2022 | Haartsen | H04W 72/56 |
| 11,843,551 B2* | 12/2023 | Salim | H04W 72/0446 |
| 12,101,806 B2* | 9/2024 | Fehrenbach | H04W 72/21 |
| 2011/0034169 A1* | 2/2011 | Roberts | H04W 48/18 |
| | | | 455/435.3 |
| 2012/0039197 A1* | 2/2012 | Jang | H04W 36/302 |
| | | | 370/252 |
| 2012/0276936 A1 | 11/2012 | Ahn et al. | |
| 2013/0176885 A1* | 7/2013 | Lee | H04W 36/0085 |
| | | | 370/252 |
| 2014/0099969 A1* | 4/2014 | Hwang | H04W 76/18 |
| | | | 455/453 |
| 2014/0141825 A1 | 5/2014 | Koo et al. | |
| 2015/0181471 A1* | 6/2015 | Jang | H04W 36/20 |
| | | | 455/552.1 |
| 2017/0311312 A1* | 10/2017 | Koo | H04W 16/14 |
| 2018/0092085 A1 | 3/2018 | Shaheen et al. | |
| 2018/0263048 A1 | 9/2018 | Ingale et al. | |
| 2020/0084764 A1* | 3/2020 | Kim | H04W 56/001 |
| 2020/0178094 A1* | 6/2020 | Baghel | H04W 24/02 |
| 2021/0153057 A1* | 5/2021 | Zheng | H04B 17/345 |

FOREIGN PATENT DOCUMENTS

| | | |
|---|---|---|
| CN | 103155647 A | 6/2013 |
| CN | 103416087 A | 11/2013 |
| CN | 104272806 A | 1/2015 |
| CN | 104885546 A | 9/2015 |
| CN | 105451347 A | 3/2016 |
| CN | 108551680 A | 9/2018 |
| CN | 109495915 A | 3/2019 |
| CN | 110769440 A | 2/2020 |

OTHER PUBLICATIONS

Qualcomm Incorporated, NTT Docomo Inc. "Introduction of In-Device Coexistence solution for EN-DC," 3GPP TSG-RAN WG2 AH, Meeting #1807, R2-1809481, Montreal, Canada, Jul. 2-6, 2018, (15p).

The First CNOA issued in Application No. 202111013613.5 dated Nov. 2, 2023 with English translation, (23p).

* cited by examiner

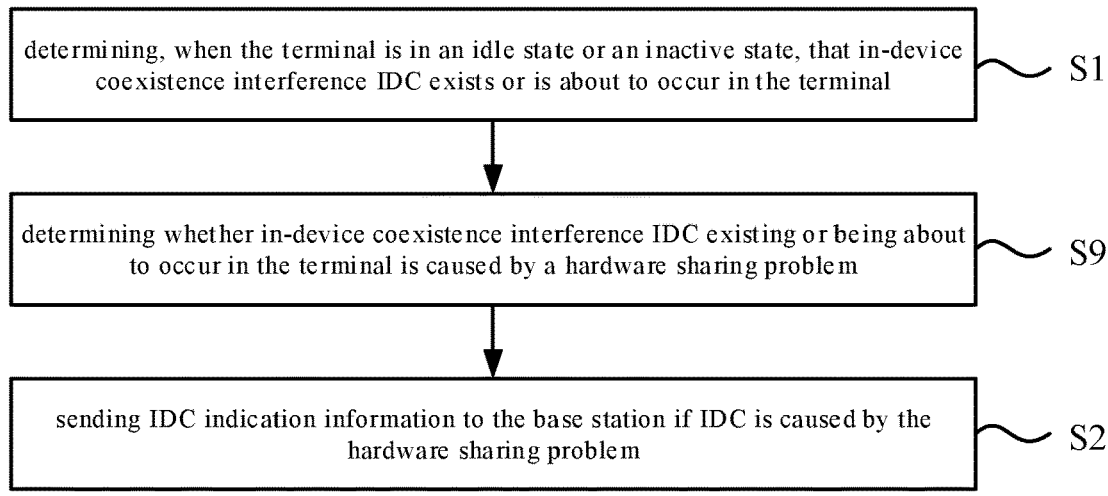
Fig. 9
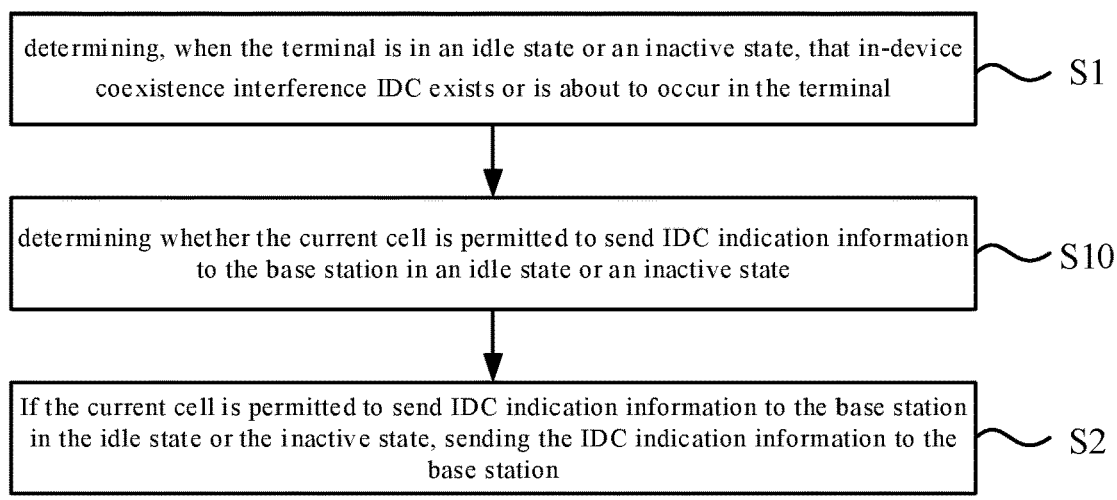
Fig. 10
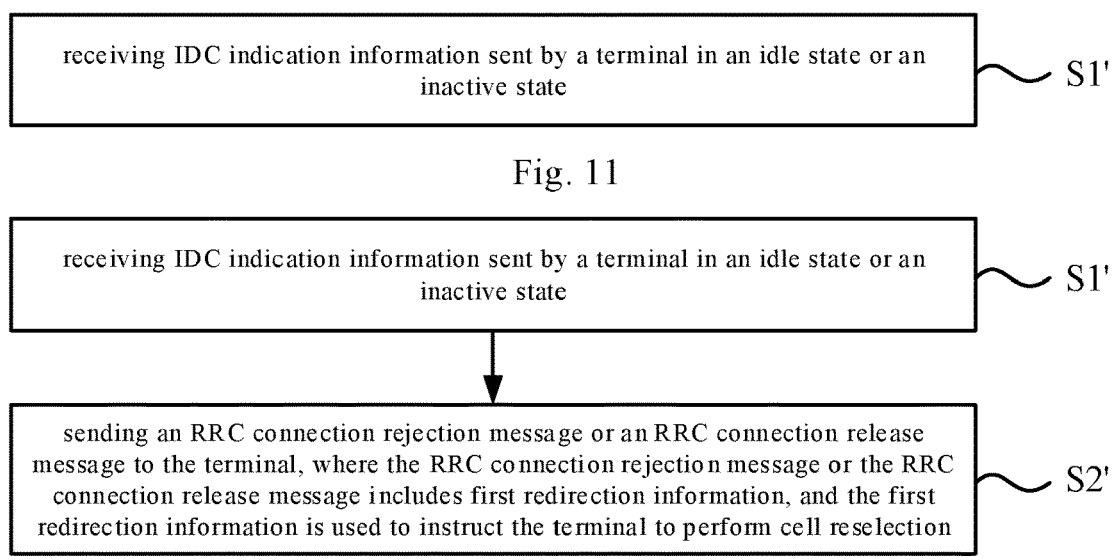
Fig. 11
Fig. 12

METHOD FOR IN-DEVICE COEXISTENCE INTERFERENCE INDICATION AND METHOD AND APPARATUS FOR IN-DEVICE COEXISTENCE INTERFERENCE RECEIVING

CROSS REFERENCE TO RELATED APPLICATION

The present application is a national phase of International Application No. PCT/CN2019/096868 filed on Jul. 19, 2019, the entire disclosure of which is incorporated herein as a part of the present application for all purposes.

TECHNICAL FIELD

The present disclosure relates to the field of communication technology, and in particular, relates to an in-device coexistence interference indication method, an in-device coexistence interference receiving method, an in-device coexistence interference indication apparatus, an in-device coexistence interference receiving apparatus, an electronic device, and a computer-readable storage medium.

BACKGROUND

Currently, terminals may communicate based on a variety of networks, and signals between different networks may produce interference, rendering the terminals unable to communicate normally.

In this case, the related technology introduced an in-device coexistence interference (also referred to as IDC) solution. Specifically, when the in-device coexistence interference appears in a terminal, and the terminal itself can not solve the in-device coexistence interference, the IDC indication information is reported to the base station, so that the base station determines the carrier frequency that causes interference or suffers from interference.

SUMMARY

Embodiments of the present disclosure propose an in-device coexistence interference indication method, an in-device coexistence interference receiving method, an in-device coexistence interference indication apparatus, an in-device coexistence interference receiving apparatus, an electronic device, and a computer-readable storage medium, so as to solve problems such as the terminal merely sending IDC indication information to the base station in a connected state.

According to a first aspect of the present disclosure, an in-device coexistence interference indication method is proposed, which is applied to a terminal. The method includes: determining, when the terminal is in an idle state or in an inactive state, that in-device coexistence interference IDC exists or is about to occur in the terminal; and sending IDC indication information to the base station.

According to a second aspect of the present disclosure, an in-device coexistence interference receiving method is proposed, which is applied to a base station. The method includes: receiving IDC indication information sent by a terminal in an idle or inactive state.

According to a third aspect of the present disclosure, an in-device coexistence interference indication apparatus is proposed, which is applied to a terminal. The apparatus includes: an IDC determination module, configured to determine, when the terminal is in an idle state or inactive state, that in-device coexistence interference IDC exists or is about to occur in the terminal; and an IDC sending module, configured to send IDC indication information to the base station.

According to a fourth aspect of the present disclosure, an in-device coexistence interference receiving apparatus is proposed, which is applied to a base station. The apparatus includes: an IDC receiving module, configured to receive IDC indication information sent by a terminal in an idle state or inactive state.

According to a fifth aspect of the present disclosure, an electronic device is proposed, including: a processor; and a memory, configured to store processor executable instructions, where the processor is configured to implement the in-device coexistence interference indication method described in any of the foregoing embodiments.

According to a sixth aspect of the present disclosure, an electronic device is proposed, including: a processor; and a memory, configured to store processor executable instructions, where the processor is configured to implement the in-device coexistence interference receiving method described in any of the foregoing embodiments.

According to a seventh aspect of the present disclosure, a computer-readable storage medium is provided, on which a computer program is stored. When the computer program is executed by a processor, steps of the in-device coexistence interference indication method described in any of the above embodiments is implemented.

According to a eighth aspect of the present disclosure, a computer-readable storage medium is provided, on which a computer program is stored. When the computer program is executed by a processor, steps of the in-device coexistence interference receiving method described in any of the above embodiments is implemented.

According to embodiments of the present disclosure, when the terminal is in an idle state or inactive state, it is determined that IDC exists or is about to occur in the terminal, and IDC indication information is sent to the base station. In this way, it is ensured that the terminal operating in the idle state and the inactive state may also send IDC indication information to the base station when IDC exists or is about to occur. Thus, the base station may determine the carrier information that causes or suffers from interference, and then provide solutions about IDC, such that the communication quality of the terminal in the idle state and the inactive state is ensured.

BRIEF DESCRIPTION OF THE DRAWINGS

In order to more clearly describe the technical solutions in embodiments of the present disclosure, the following will briefly introduce the drawings in the description of embodiments. The drawings in the following description are only some of the present disclosure. For those of ordinary skill in the art, other drawings may be obtained based on these drawings without creative labor.

FIG. 9 is a schematic flowchart showing another in-device coexistence interference indication method according to an embodiment of the present disclosure.

FIG. 10 is a schematic flowchart showing another in-device coexistence interference indication method according to an embodiment of the present disclosure.

FIG. 11 is a schematic flowchart showing an in-device coexistence interference receiving method according to an embodiment of the present disclosure.

FIG. 12 is a schematic flowchart showing another in-device coexistence interference receiving method according to an embodiment of the present disclosure.

DETAILED DESCRIPTION OF THE EMBODIMENTS

The following will clearly and completely describe the technical solutions in embodiments of the present disclosure in conjunction with the accompanying drawings in embodiments of the present disclosure. The described embodiments are only a part of embodiments of the present disclosure, not all of them. Based on embodiments in the present disclosure, all other embodiments obtained by those of ordinary skill in the art without creative work shall fall within the protection scope of the present disclosure.

Figure 1:
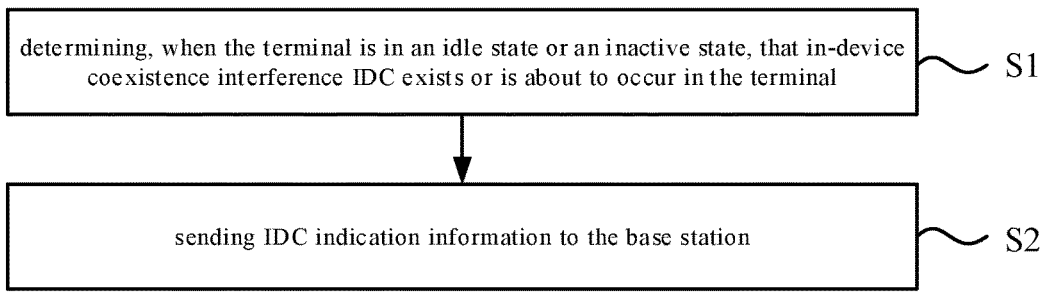
FIG. 1 is a schematic flowchart showing an in-device coexistence interference indication method according to an embodiment of the present disclosure.

FIG. 1 is a schematic flow chart of an in-device coexistence interference indication method according to an embodiment of the present disclosure. The in-device coexistence interference indication method shown in an embodiment may be applied to a terminal such as mobile phone, tablet, wearable device, etc. Such terminal may be used as a user equipment for communicating with a base station. The communication with the base station may be based on 5G New Radio (NR) Communication. For example, the terminal may communicate with the base station based on NR-U.

As shown in FIG. 1, the in-device coexistence interference indication method may include the following steps S1-S2.

In step S1, when the terminal is in an idle state or inactive state, it is determined that in-device coexistence interference IDC exists or is about to occur in the terminal.

In step S2, IDC indication information is sent to the base station.

In an embodiment, the terminal may use an operator's network, such as 5G network communication. Alternatively, the terminal may also use networks in other frequency bands, such as Wi-Fi, Bluetooth, Global Navigation Satellite System, Global Navigation Satellite System (GNSS), etc., for communication. Wi-Fi, Bluetooth, GNSS and other networks belong to Industrial Scientific Medical (ISM) frequency bands.

In a case where mutual interference exists between 5G network and the network in the ISM frequency band, it may be determined that in-device coexistence interference occurs in the terminal. Alternatively, in a case where mutual interference is about to occur between 5G network and the network in the ISM frequency band, it may be determined that in-device coexistence interference will be occur in the terminal. For example, a time period may be set in advance, which is called the preset time period, and then it is determined whether in-device coexistence interference exists in the terminal during the preset time period after the current moment. If the in-device coexistence interference does not exist in the terminal during the preset time period after the current moment, it is determined that the in-device coexistence interference will occur in the terminal.

In an embodiment, IDC being about to occur, means that IDC may exist in the terminal within a preset time period after the current moment. The preset time period may be configured by the base station or set by the terminal itself. If IDC is IDC that is about to appear, the terminal may also send to the base station the time moment at which the IDC occurs in the future. Thus, the base station may solve IDC in time. For example, it may be solved before the above time moment, or it may be solved exactly at the above time moment.

It should be noted that when in-device coexistence interference exists or is about to occur in the terminal, the terminal may first determine whether the in-device coexistence interference existing or being about to occur can be solved by itself. Only in a case where the in-device coexistence interference cannot be solved by the terminal itself, the information about the sub-band of the carrier frequency is sent to the base station.

For a terminal using NR-U communication, the terminal is not limited to be operating in a connected state, and it may also operate in an idle state and inactive state. According to some embodiments of the present disclosure, when the terminal is in an idle state or inactive state, it may be determined that IDC exists or will occur in the terminal, and IDC indication information is sent to the base station. In this way, it may be ensured that the terminal operating in the idle state and the inactive state can also send IDC indication information to the base station when IDC exists or is about to occur. Thus, the base station can determine the carrier information that causes or suffers from interference, and then provide solutions about IDC, so as to ensure the communication quality of the terminal in the idle state and the inactive state.

Figure 2:
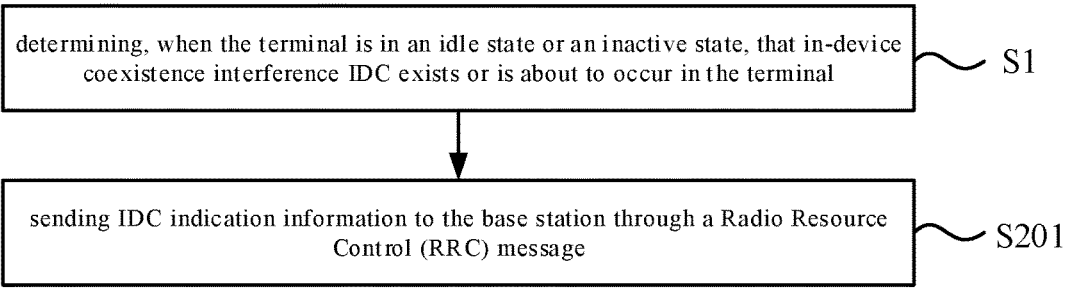
FIG. 2 is a schematic flowchart showing another in-device coexistence interference indication method according to an embodiment of the present disclosure.

FIG. 2 is a schematic flowchart of another in-device coexistence interference indication method according to an embodiment of the present disclosure. As shown in FIG. 2, the sending IDC indication information to the base station includes: in step S201, sending the IDC indication information to the base station through a Radio Resource Control (RRC) message.

In an embodiment, the terminal may send the IDC indication information to the base station through an RRC message.

According to some embodiments, the RRC message includes at least one of the following: RRC connection establishment request message, RRC connection resume request message, RRC connection establishment completion message, RRC connection resume completion message, IDC problem indication message, and user equipment assistance information report message.

In an embodiment, the main function of messages such as the RRC connection establishment request message, the RRC connection resume request message, the RRC connection establishment complete message, and the RRC connection resume complete message is not to send IDC indication information. In an embodiment, with these messages carrying IDC indication information, the multiplexing of such messages is realized, the number of messages sent by the terminal to the base station is reduced, and the resource overhead is reduced.

In addition to multiplexing of the above RRC messages, IDC indication information may be also sent through some dedicated RRC messages, such as IDC problem indication message, user equipment assistance information report message, etc. The main function of these dedicated RRC messages is to send IDC indication information.

In an embodiment, the RRC connection establishment request message and the RRC connection resume request message are taken as examples, and the IDC indication information may be contained in the Cause Information Element (also referred to as Cause IE).

Figure 3:
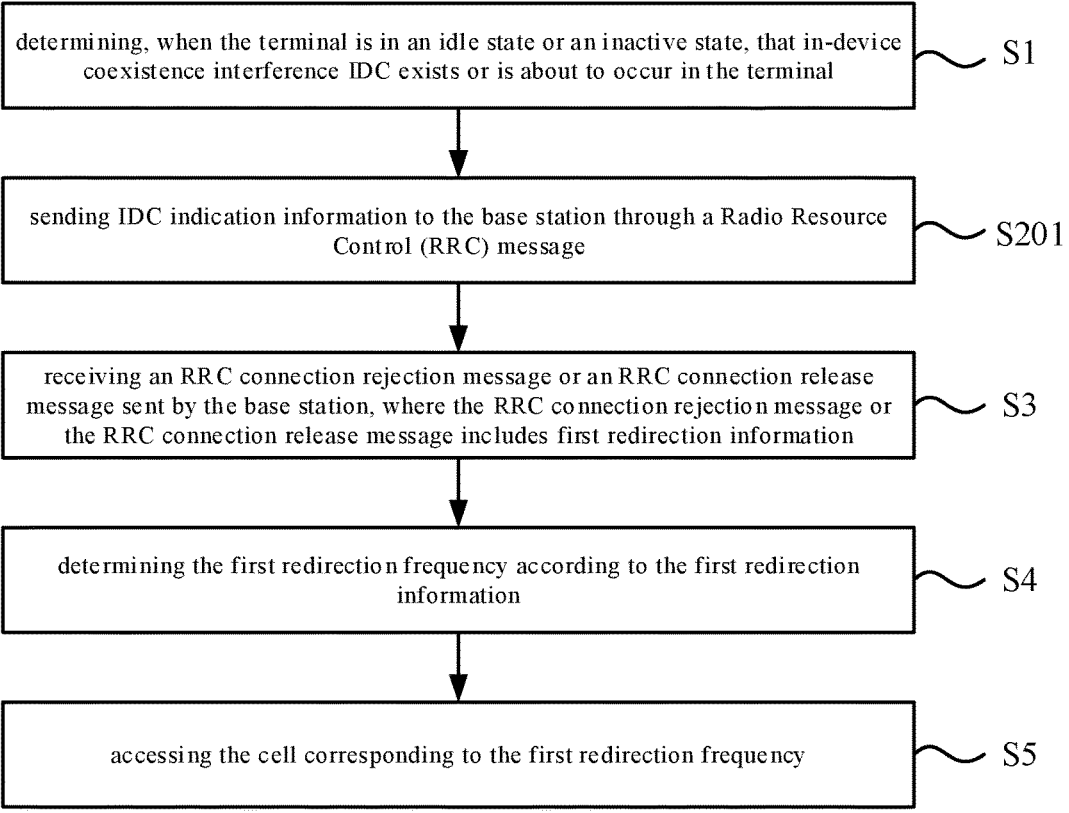
FIG. 3 is a schematic flowchart showing another in-device coexistence interference indication method according to an embodiment of the present disclosure.

FIG. 3 is a schematic flowchart showing another in-device coexistence interference indication method according to an embodiment of the present disclosure. As shown in FIG. 3, the RRC message is an RRC connection establishment request message or an RRC connection resume request message, and the method further includes the following steps S3-S5.

In step S3, an RRC connection rejection message or an RRC connection release message sent by the base station is received, where the RRC connection rejection message or the RRC connection release message includes first redirection information.

In step S4, the first redirection frequency is determined according to the first redirection information.

In step S5, the cell corresponding to the first redirection frequency is accessed.

In an embodiment, the RRC message carrying IDC indication information sent by the terminal to the base station may be an RRC connection establishment request message or an RRC connection resume request message. Based on the RRC message, the base station may send an RRC connection rejection message or an RRC connection release message to the terminal, and the first redirection information may be carried in the RRC connection rejection message or the RRC connection release message. Thus, the terminal may determine the first redirection frequency according to the first redirection information, and then access the cell corresponding to the first redirection frequency.

Accordingly, by carrying the first redirection information in the RRC connection rejection message or the RRC connection release message, multiplexing of the RRC connection rejection message or the RRC connection release message is realized, and the terminal may be instructed to access the cell corresponding to the first redirection frequency for cell reselection. At the same time, because different cells correspond to different (carrier) frequencies, after the terminal performs cell reselection, the existence of IDC in the frequency corresponding to the reselected cell and frequency bands such as ISM can be largely avoided, thereby solving the IDC problem in the terminal.

Figure 4:
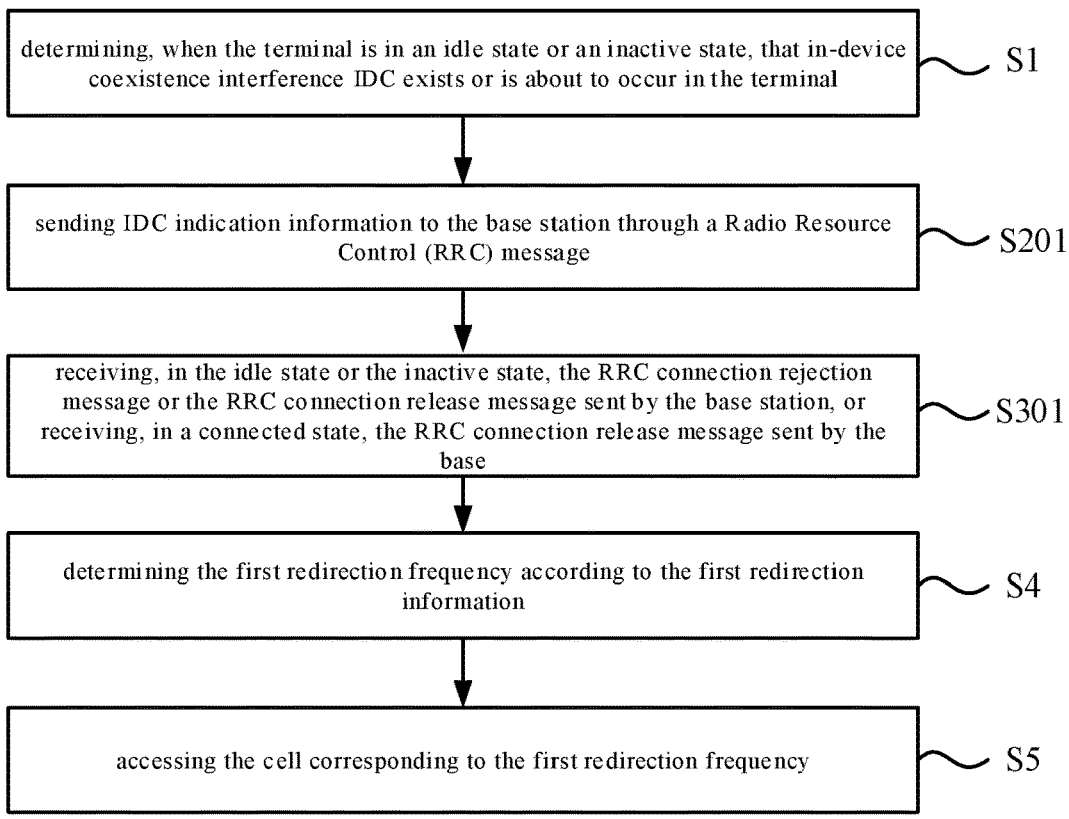
FIG. 4 is a schematic flowchart showing another in-device coexistence interference indication method according to an embodiment of the present disclosure.

FIG. 4 is a schematic flowchart of another in-device coexistence interference indication method according to an embodiment of the present disclosure. As shown in FIG. 4, the receiving the RRC connection rejection message or the RRC connection release message sent by the base station includes: in step S301, receiving, in an idle state or inactive state, the RRC connection rejection message or the RRC connection release message sent by the base station, or receiving, in a connected state, the RRC connection release message sent by the base station.

In an embodiment, when the terminal receives the RRC connection rejection message or the RRC connection release message, it may receive the message directly in the idle state or in the inactive state, or it may enter the connected state first and then receive the RRC connection release message in the connected state. The specific receiving method may be set as required.

According to some embodiments, the first redirection information is a first redirection frequency.

In an embodiment, the RRC connection rejection message or the RRC connection release message may directly carry the first redirection frequency as the first redirection information, and the terminal may directly obtain the first redirection frequency.

Figure 5:
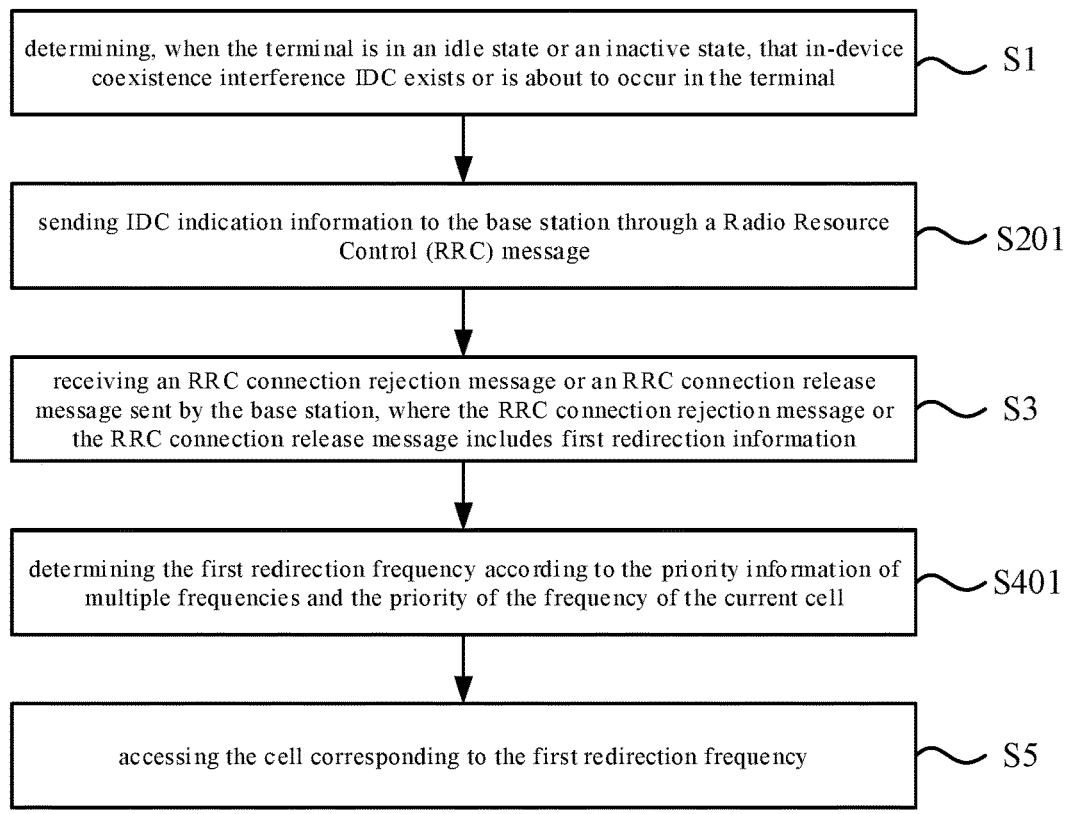
FIG. 5 is a schematic flowchart showing another in-device coexistence interference indication method according to an embodiment of the present disclosure.

FIG. 5 is a schematic flowchart showing another in-device coexistence interference indication method according to an embodiment of the present disclosure. As shown in FIG. 5, the first redirection information is priority information of multiple frequencies, and the determining the first redirection frequency according to the first redirection information includes: in step S401, determining the first redirection frequency according to the priority information of the multiple frequencies and the priority of the frequency of the current cell.

In an embodiment, the RRC connection rejection message or the RRC connection release message may carry priority information of multiple frequencies as the first redirection information, and the terminal may use the priority information of multiple frequencies and the priority of the frequency of the current cell to determine the first redirection frequency. For example, the frequency with the highest priority may be selected as the first redirection frequency among multiple frequencies and the frequency of the current cell.

If the frequency with the highest priority is still the frequency of the current cell, the frequency with the second highest priority may be selected as the first redirection frequency.

Figure 6:
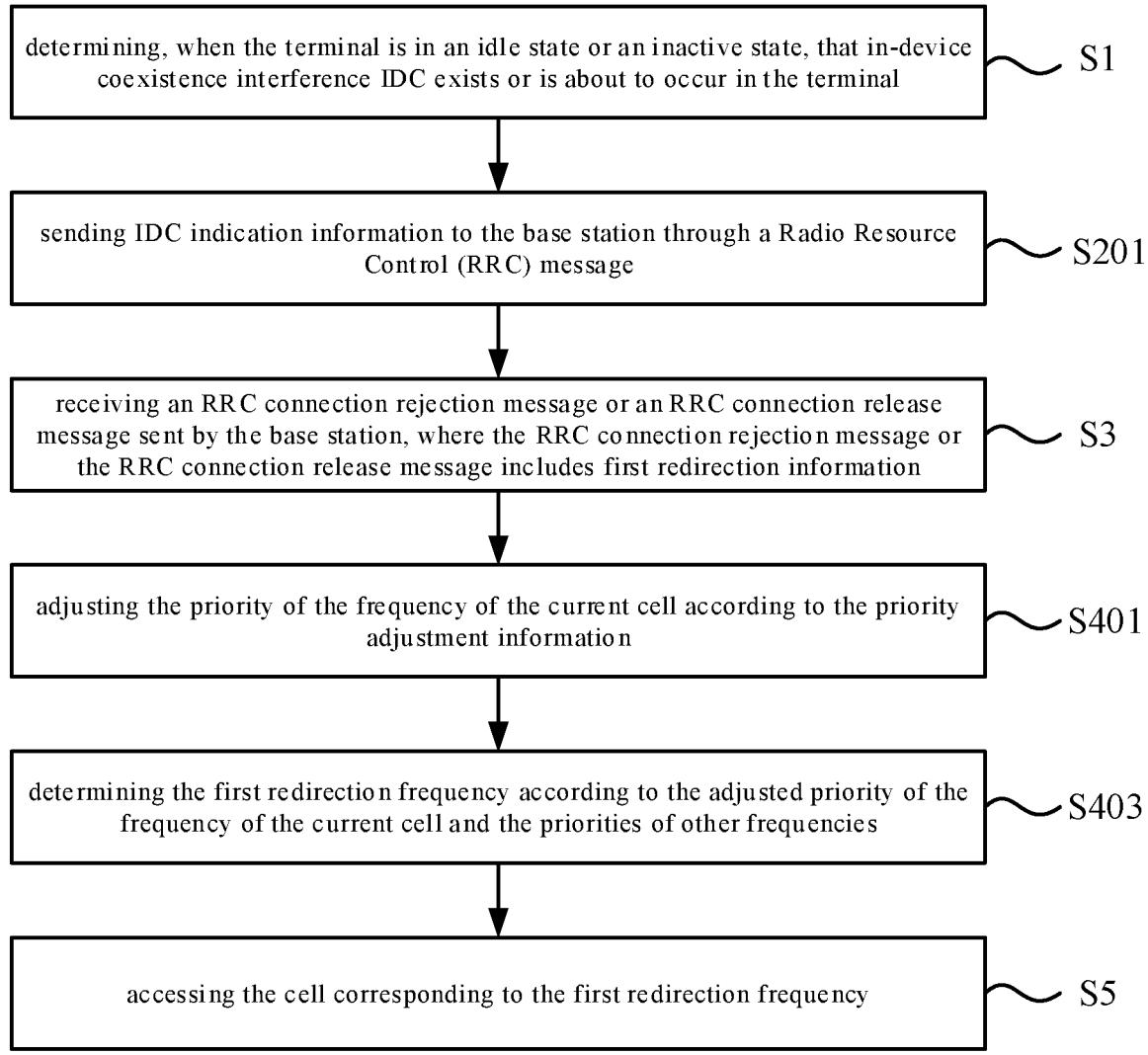
FIG. 6 is a schematic flowchart showing another in-device coexistence interference indication method according to an embodiment of the present disclosure.

FIG. 6 is a schematic flow chart showing yet another in-device coexistence interference indication method according to an embodiment of the present disclosure. As shown in FIG. 6, the first redirection information is priority adjustment information, and the determining the first redirection frequency according to the first redirection information includes the following steps S402-S403.

In step S402, the priority of the frequency of the current cell is adjusted according to the priority adjustment information.

In step S403, the first redirection frequency is determined according to the adjusted priority of the frequency of the current cell and the priorities of other frequencies.

In an embodiment, the RRC connection rejection message or the RRC connection release message may carry priority adjustment information as the first redirection information, and the terminal may adjust the priority of the frequency of the current cell according to the priority adjustment information. Then, according to the adjusted priority of the frequency of the current cell and the priorities of other frequencies, the first redirection frequency may be determined. For example, the frequency with the highest priority may be selected as the first redirection frequency among other frequencies and the adjusted frequency of the current cell.

If the frequency with the highest priority is still the frequency of the current cell, the frequency with the second highest priority may be selected as the first redirection frequency.

Figure 7:
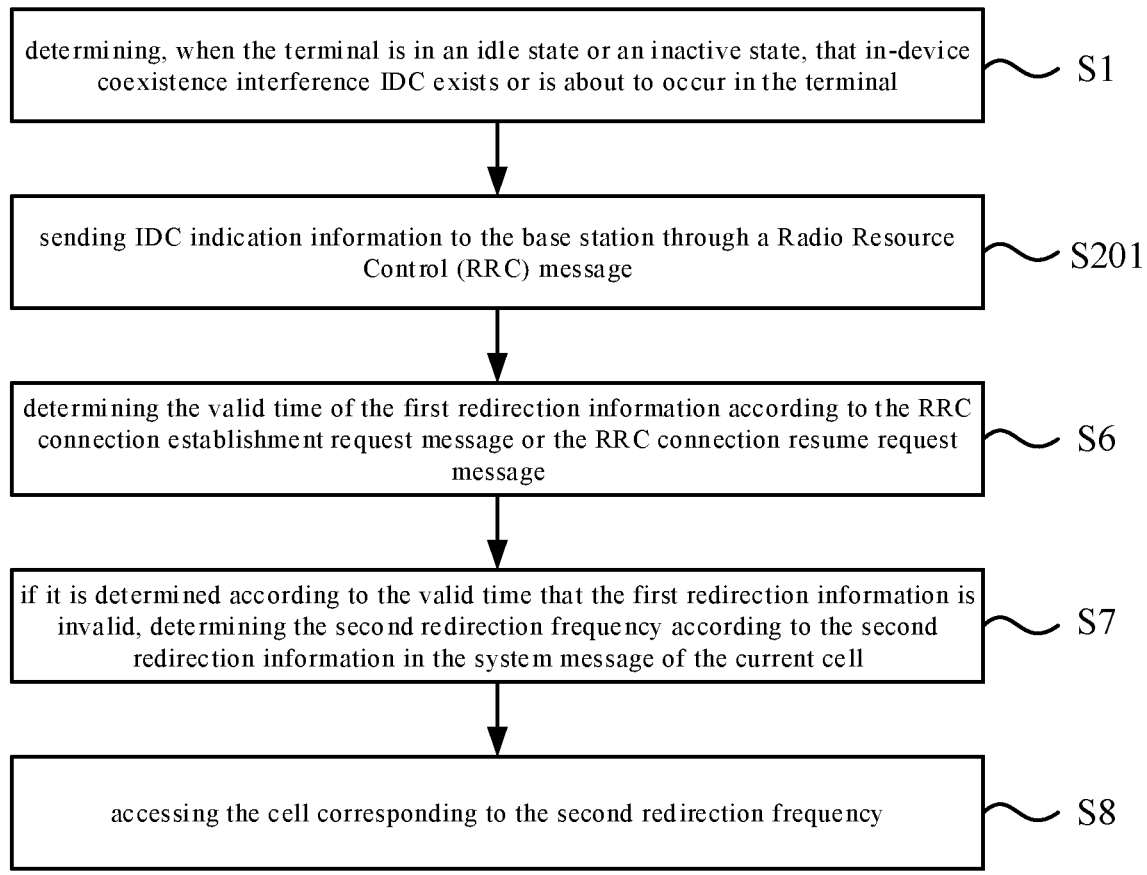
FIG. 7 is a schematic flowchart showing another in-device coexistence interference indication method according to an embodiment of the present disclosure.

FIG. 7 is a schematic flowchart of another in-device coexistence interference indication method according to an embodiment of the present disclosure. As shown in FIG. 7, the RRC connection establishment request message or the RRC connection resume request message is further used to indicate the valid time of the first redirection information, and the method further includes the following steps S6-S8.

In step S6, the valid time of the first redirection information is determined according to the RRC connection establishment request message or the RRC connection resume request message.

In step S7, if it is determined according to the valid time that the first redirection information is invalid, the second redirection frequency is determined according to the second redirection information in the system message of the current cell.

In step S8, the cell corresponding to the second redirection frequency is accessed.

In an embodiment, the base station may further indicate the valid time of the first redirection information through the RRC connection establishment request message or the RRC connection resume request message. That is, the terminal may prioritize determination of the redirection frequency based on the first redirection information within the valid time. After the valid time has elapsed, it can be determined that the first redirection information is invalid.

The pre-received system message of the current cell may carry the second redirection information, and the terminal may determine the second redirection frequency according to the second redirection information, and then access the cell corresponding to the second redirection frequency.

Regardless of accessing the cell corresponding to the first redirection frequency or accessing the cell corresponding to the second redirection frequency, the IDC indication may be sent to the base station in the way as described in the foregoing embodiments, as long as IDC still exists in the terminal.

According to some embodiments, the IDC indication information further includes valid time suggestion information, and the valid time suggestion information is used by the base station to determine the valid time of the first redirection information.

In an embodiment, although the valid time of the first redirection information is indicated to the terminal by the base station, the terminal may also determine the valid time by the valid time suggestion information carried in the IDC indication information for reference by the base station. This enables the valid time indicated by the base station to the terminal to be more suitable for the actual situation of the terminal.

Figure 8:
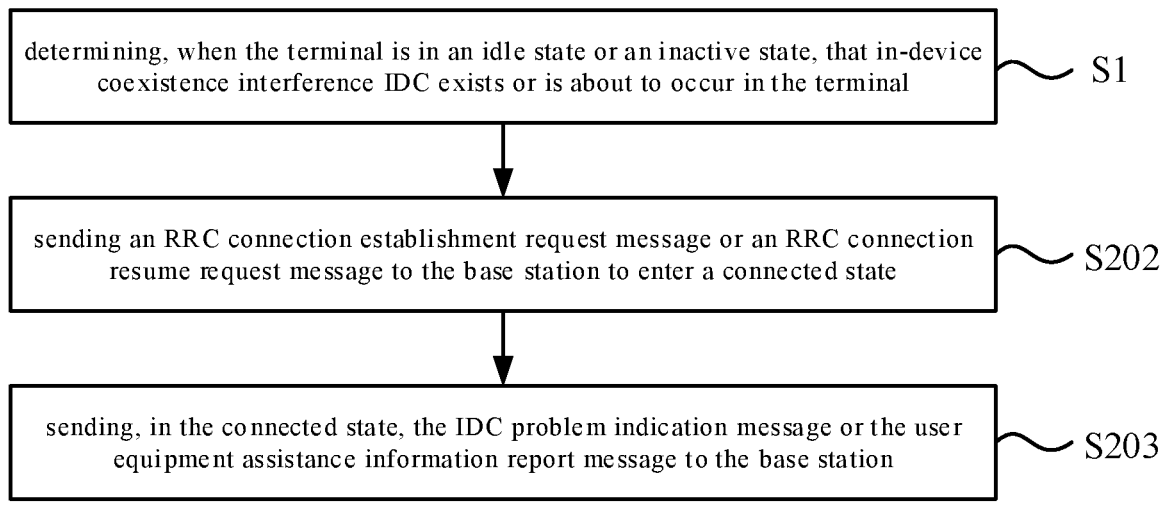
FIG. 8 is a schematic flowchart showing another in-device coexistence interference indication method according to an embodiment of the present disclosure.

FIG. 8 is a schematic flowchart of another in-device coexistence interference indication method according to an embodiment of the present disclosure. As shown in FIG. 8, the RRC message is an IDC problem indication message or a user equipment assistance information report message, and the sending of the IDC indication information to the base station includes the following steps S202-S203.

In step S202, an RRC connection establishment request message or an RRC connection resume request message is sent to the base station to enter a connected state.

In step S203, the IDC problem indication message or the user equipment assistance information report message is sent to the base station in the connected state.

In an embodiment, the terminal may first send an RRC connection establishment request message or an RRC connection resume request message to the base station to enter the connected state, and then in the connected state, send an IDC problem indication message or a user equipment assistance information report message to the base station for carrying the IDC indication information.

FIG. 9 is a schematic flowchart showing another in-device coexistence interference indication method according to an embodiment of the present disclosure. As shown in FIG. 9, before sending IDC indication information to the base station, the method includes the following step S9.

In step S9, it is determined whether in-device coexistence interference IDC existing or being about to occur in the terminal is caused by the hardware sharing problem.

If the IDC is caused by the hardware sharing problem, the IDC indication information is sent to the base station.

In an embodiment, IDC caused by a hardware sharing problem is generally due to the use of an antenna of the operator's network communication by the terminal, which antenna overlaps with an antenna of the ISM frequency band communication (or due to other hardware multiplexing). As a result, IDC caused by such problem has a more serious impact on the terminal communication than IDC caused by other problems (for example, merely interferences between communication frequency bands).

Therefore, in an embodiment, the IDC indication information is sent to the base station in the idle state or the inactive state only when IDC is caused by the hardware sharing problem, so as to ensure that the terminal can work normally in the idle state and the inactive state. For IDC caused by other problems, it may wait until the connected state to send the IDC indication information to the base station.

FIG. 10 is a schematic flowchart showing another in-device coexistence interference indication method according to an embodiment of the present disclosure. As shown in FIG. 10, before sending IDC indication information to the base station, the method further includes the following step S10.

In step S10, it is determined whether the current cell is permitted to send IDC indication information to the base station in an idle state or inactive state.

If the current cell is permitted to send IDC indication information to the base station in the idle state or in the inactive state, the IDC indication information is sent to the base station.

In an embodiment, the IDC indication information may be sent to the base station in the idle state or in the inactive state only when the current cell is permitted to send the IDC indicator information to the base station in the idle or inactive state. Thus, it is ensured that the communication between the terminal and the base station meets the requirements for terminal communication by the current cell.

According to some embodiments, the IDC indication information further includes interference direction information.

In an embodiment, the terminal may further send information about the carrier interference direction to the base station. Thus, the base station may clearly determine whether the carrier in the operator's network (including but not limited to 5G network) used by the terminal is being affected by networks in other frequency bands or causing interferences to networks in other frequency bands, so that the terminal may accurately determine how to solve the in-device coexistence interference existing or being about to occur in the terminal.

For example, if the carrier A in the 5G network used by the terminal is interfered by the network in the ISM frequency band, then the interference direction information may be the network interference carrier A in the ISM frequency band. For example, if the carrier A in the 5G network used by the terminal causes interferences to the network in the ISM frequency band, then the information about the interference direction may be that the carrier A causes interferences to the network in the ISM frequency band.

In an embodiment, based on the carrier interference direction information, and priorities of the operator's network used by the terminal and the network in other frequency bands, the base station may determine how to solve the in-device coexistence interference existing or being about to occur in the terminal.

For example, the interference direction information indicates that the carrier in the operator's network is interfered by networks in other frequency bands, and the operator's network has a higher priority. In this case, the signal power for communication with the terminal may be increased, so that the terminal can receive the information carried by the carrier in the operator's network. For example, the interference direction information indicates that the carrier in the operator's network causes interference to the network in other frequency bands, and the priority of the network in other frequency bands is higher. In this case, the communication between the carrier in the operator's network and the terminal may be suspended, so that the terminal has the priority to receive information from the network with a higher priority.

It should be noted that the interference direction information is not limited to indicate the carrier in the operator's network being interfered by networks in other frequency bands and causing interferences to networks in other frequency bands. It may also indicate the interference between operators' networks, for example, the interference between 4G network and 5G network.

Besides, the in-device coexistence interference is not limited to the interference between two networks, and the interference direction information is not limited to the interference direction between two networks. For example, the in-device coexistence interference includes the interference of the carrier in the 4G network to the carrier in the 5G network, and the interference of the carrier in the 5G network to the network in the ISM frequency band. In this case, the interference direction information may include two pieces, one indicating that the carrier in the 4G network causes interferences to the carrier in the 5G network, and the other indicating that the carrier in the 5G network causes interferences to the network in the ISM frequency band.

According to some embodiments, the IDC indication information further includes IDC assistance information.

In an embodiment, the IDC assistance information may include the carrier frequency of the carrier that suffers from interference or causes interference, and the information of the sub-band that suffers from or causes interference in the carrier.

For example, carrier A with carrier frequency X in the 5G network used by the terminal is interfered by the network in the ISM band. The bandwidth of carrier A is 100 MHz, and carrier A includes 5 sub-bands, each of which has a bandwidth of 20 MHz (the bandwidth of each sub-band may also be different, and it may be set as required). Specifically, if the second frequency band among the 5 sub-bands is interfered, the terminal may send the carrier frequency X of carrier A to the base station, and the identification information of the second sub-band. Thus, the base station may determine, according to the carrier frequency X, that carrier A is interfered in the 5G network used by the terminal, and determine, according to the identification information of the second sub-band, that the second sub-band of carrier A is interfered. In this way, the specific frequency band that is interfered in the carrier may be accurately determined, so that the base station may accurately determine how to solve the in-device coexistence interference that exists or is about to occur in the terminal.

In an embodiment, the IDC assistance information may further include interference degree information, such as level identification, decibel value, and so on.

In an embodiment, the degree information about the impact suffered by the carrier or the impact caused by the carrier may be a specific decibel value (also referred to as db value), such as 20 dB interference, 50 dB interference, etc., or a level identification. In this case, the terminal and the base station may pre-store the association relationship between the level identification and the specific decibel value. The terminal may determine, according to the association relationship, the level identification corresponding to the decibel value that causes or suffers from interference, and then reports the level identification to the base station. Then, the base station may determine the decibel value corresponding to the level identification according to the association relationship. For example, the level identification a corresponds to 10 dB, the level identification b corresponds to 20 dB, and the level identification c corresponds to 30 dB. In this way, when the received degree information is b, it can be determined that the level identification b corresponds to 20 dB.

It should be noted that the association relationship between the level identification and the decibel value may be determined by the terminal itself, and then notified to the base station. Alternatively, the association relationship may be configured by the base station to the terminal.

In an embodiment, the IDC assistance information may also carry Discontinuous Reception (DRX) configuration or time division multiplexing pattern (TDM pattern) configuration recommended for the terminal to use in an idle state or in an inactive state.

FIG. 11 is a schematic flowchart of an in-device coexistence interference receiving method according to an embodiment of the present disclosure. The in-device coexistence interference receiving method shown in an embodiment may be applied to a base station. The base station may communicate with a terminal such as mobile phone, tablet, and wearable device. Such communication with the terminal may be based on 5G New Radio (NR). For example, the communication with the terminal may be based on NR-U.

As shown in FIG. 11, the in-device coexistence interference receiving method may include the following step S1'.

In step S1', the IDC indication information, which is sent by a terminal in an idle state or inactive state, is received.

According to an embodiment of the present disclosure, when the terminal is in an idle state or inactive state, it may determine that IDC exists or is about to occur in the terminal, and send IDC indication information to the base station. In view of above, the base station may be able to receive the IDC indication information sent from the terminal when IDC exists or is about to occur in the terminal operating in the idle state and the inactive state. Thus, the carrier information that causes or suffers from interference may be determined, and then solutions may be provided to the IDC problem, so as to ensure the communication quality of the terminal in the idle state and the inactive state.

According to some embodiments, the IDC indication information is included in an RRC message.

According to some embodiments, the RRC message includes at least one of the following: RRC connection establishment request message, RRC connection resume request message, RRC connection establishment completion message, RRC connection resume completion message, IDC problem indication message, and user equipment assistance information report message.

In an embodiment, the main purpose of messages such as the RRC connection establishment request message, the RRC connection resume request message, the RRC connection establishment complete message, and the RRC connection resume complete message is not to send IDC indication information. In an embodiment, with these messages carrying IDC indication information, multiplexing of such messages may be realized, and the number of messages sent by the terminal and received by the base station may be reduced, thereby reducing the resource overhead.

In addition to multiplexing of the above RRC messages, the IDC indication information may be also sent through some dedicated RRC messages, such as IDC problem indication messages, user equipment assistance information reporting messages, etc. The main function of these dedicated RRC messages is to send the IDC indication information.

FIG. 12 is a schematic flowchart of another in-device coexistence interference receiving method according to an embodiment of the present disclosure. As shown in FIG. 12, the RRC message is an RRC connection establishment request message or an RRC connection resume request message, and the method further includes the following step S2'.

In step S2', an RRC connection rejection message or an RRC connection release message is sent to the terminal, where the RRC connection rejection message or the RRC connection release message includes first redirection information, and the first redirection information is used to instruct the terminal to perform cell reselection.

In an embodiment, the RRC message carrying IDC indication information sent by the terminal and received by the base station may be an RRC connection establishment request message or an RRC connection resume request message. Based on the RRC message, the base station may send an RRC connection rejection message or an RRC connection release message to the terminal, and the first redirection information may be carried in the RRC connection rejection message or the RRC connection release message. Thus, the terminal may determine the first redirection frequency according to the first redirection information, and then access the cell corresponding to the first redirection frequency.

Accordingly, by carrying the first redirection information in the RRC connection rejection message or the RRC connection release message, multiplexing of the RRC connection rejection message or the RRC connection release message is realized, and the terminal may be instructed to access the cell corresponding to the first redirection frequency for cell reselection. At the same time, because different cells correspond to different (carrier) frequencies, after the terminal performs cell reselection, the existence of IDC in the frequency corresponding to the reselected cell and frequency bands such as ISM may be larged avoided, thereby solving the IDC problem in the terminal.

Figure 13:
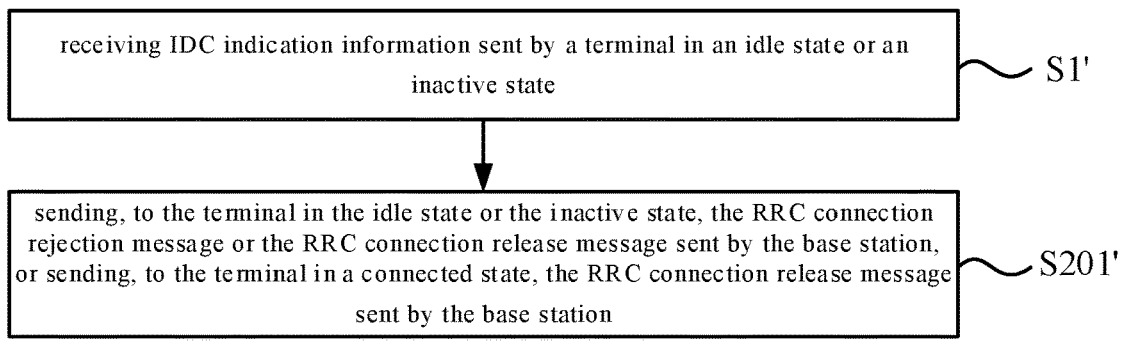
FIG. 13 is a schematic flowchart showing another in-device coexistence interference receiving method according to an embodiment of the present disclosure.

FIG. 13 is a schematic flowchart showing another in-device coexistence interference receiving method according to an embodiment of the present disclosure. As shown in FIG. 13, the sending the RRC connection rejection message or the RRC connection release message to the terminal includes the following step S201'.

In step S201', the RRC connection rejection message or the RRC connection release message sent by the base station is sent to the terminal in the idle state or the inactive state, or the RRC connection release message sent by the base station is sent to the terminal after entering a connected state.

In an embodiment, the RRC connection rejection message or the RRC connection release message sent to the terminal may be sent to the terminal when the terminal is in the idle or inactive state. Alternatively, it may be sent to the terminal in the connected state after the terminal enters the connected state. The specific receiving method may be set as required.

According to some embodiments, the first redirection information is a first redirection frequency.

In an embodiment, the RRC connection rejection message or the RRC connection release message may directly carry the first redirection frequency as the first redirection information, and the terminal may directly obtain the first redirection frequency.

According to some embodiments, the first redirection information is priority information of multiple frequencies.

In an embodiment, the RRC connection rejection message or the RRC connection release message may carry the priority information of multiple frequencies as the first redirection information, and the terminal may determine the first redirection frequency according to the priority information of multiple frequencies and the priority of the frequency of the current cell. For example, the frequency with the highest priority may be selected as the first redirection frequency among the multiple frequencies and the frequency of the current cell.

According to some embodiments, the first redirection information is priority adjustment information.

In an embodiment, the RRC connection rejection message or the RRC connection release message may carry priority adjustment information as the first redirection information, and the terminal may adjust the priority of the frequency of the current cell according to the priority adjustment information. Then, according to the adjusted priority of the frequency of the current cell and the priorities of other frequencies, the first redirection frequency may be determined. For example, the frequency with the highest priority may be selected as the first redirection frequency among other frequencies and the adjusted frequency of the current cell.

According to some embodiments, the RRC connection establishment request message or the RRC connection resume request message is also used to indicate the valid time of the first redirection information.

In an embodiment, the base station may further indicate the valid time of the first redirection information through the RRC connection establishment request message or the RRC connection resume request message. That is, the terminal may prioritize determination of the redirection frequency according to the first redirection information within the valid time. After the valid time has elapsed, it may be determined that the first redirection information is invalid.

In a case where the first redirection information is invalid, since the pre-received system message of the current cell may carry second redirection information, the terminal may determine a second redirection frequency according to the second redirection information, and then access the cell corresponding to the second redirection frequency.

Figure 14:
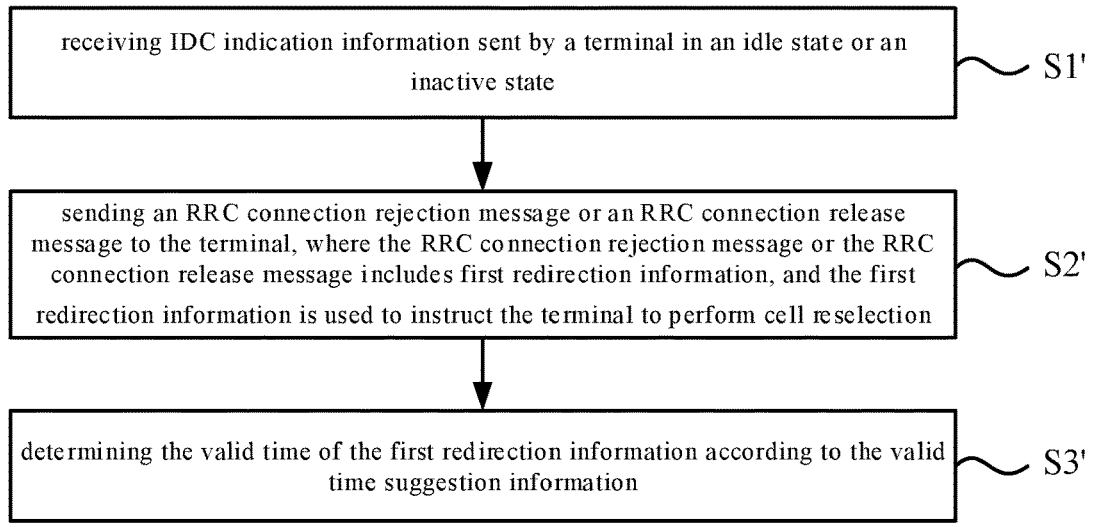
FIG. 14 is a schematic flowchart showing another in-device coexistence interference receiving method according to an embodiment of the present disclosure.

FIG. 14 is a schematic flowchart showing another in-device coexistence interference receiving method according to an embodiment of the present disclosure. As shown in FIG. 14, the IDC indication information further includes valid time suggestion information. Before receiving the IDC indication information sent by a terminal in an idle state or inactive state, the method further includes the following step S3'.

In step S3', the valid time of the first redirection information is determined according to the valid time suggestion information.

In an embodiment, although the valid time of the first redirection information is indicated to the terminal by the base station, the base station may also receive the valid time suggestion information carried by the terminal in the IDC indication information, and determine the valid time suggestion information as a reference for determining the valid time. Thus, the valid time indicated by the base station to the terminal is more suitable for the actual situation of the terminal.

Figure 15:
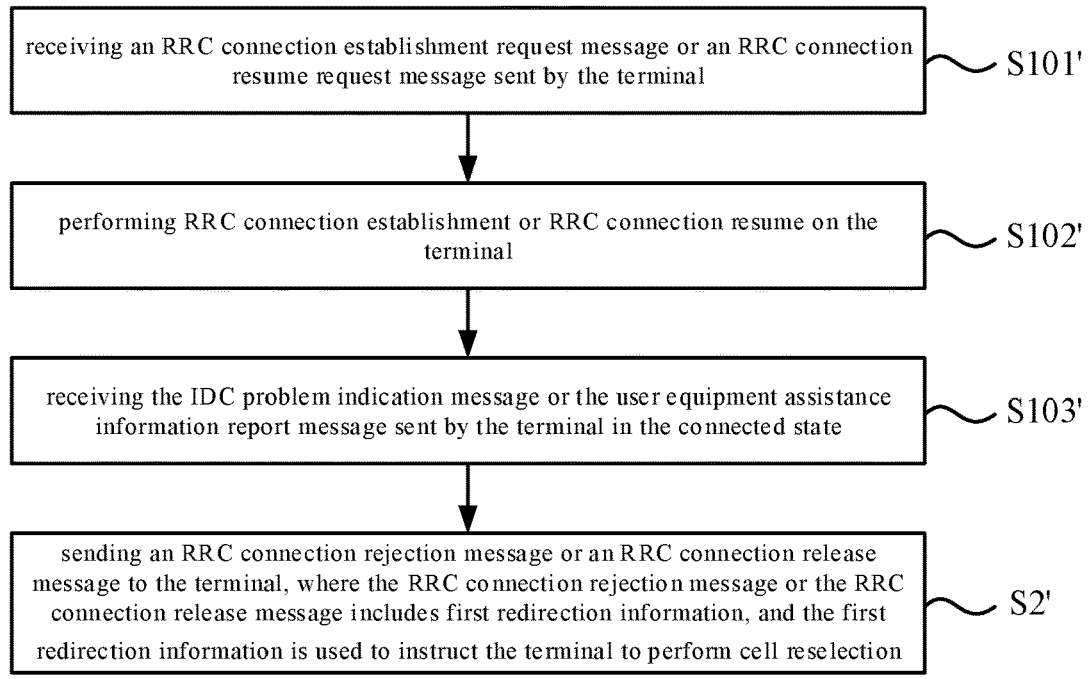
FIG. 15 is a schematic flowchart showing another in-device coexistence interference receiving method according to an embodiment of the present disclosure.

FIG. 15 is a schematic flowchart showing another in-device coexistence interference receiving method according to an embodiment of the present disclosure. As shown in FIG. 15, the RRC message is an IDC problem indication message or a user equipment assistance information report message, and the receiving IDC indication information sent by a terminal in an idle state or in an inactive state includes the following steps S101'-S103'.

In step S101', an RRC connection establishment request message or an RRC connection resume request message sent by the terminal is received.

In step S102', RRC connection establishment or RRC connection resume is performed on the terminal.

In step S103', the IDC problem indication message or the user equipment assistance information report message sent by the terminal in the connected state is received.

In an embodiment, the base station may receive the RRC connection establishment request message or the RRC connection resume request message sent by the terminal, and then perform RRC connection establishment or RRC connection resume on the terminal, so that the terminal enters the connected state. Then, the IDC indication information carried in the IDC problem indication message or the user equipment assistance information report message sent by the terminal in the connected state may be received.

According to some embodiments, the IDC indication information further includes interference direction information.

In an embodiment, the terminal may further send information about the carrier interference direction to the base station, so that the base station is clear whether the carrier in the operator's network (including but not limited to 5G network) used by the terminal is affected by other frequency bands or causing interference to the network in other frequency bands. Thus, the terminal may accurately determine how to solve the in-device coexistence interference existing or being about to occur in the terminal.

According to some embodiments, the IDC indication information further includes IDC assistance information.

In an embodiment, the IDC assistance information may include the carrier frequency of the carrier that is suffering from interference or causing interference, and the information about the sub-band that is suffering from or causing interference in the carrier.

For example, carrier A with a carrier frequency of X in the 5G network used by the terminal is interfered by the network in the ISM frequency band. The bandwidth of carrier A is 100 MHz, and carrier A includes 5 sub-bands, each of which has a bandwidth of 20 MHz (the bandwidth of each sub-band may also be different, which may be set as required). Specifically, if the second sub-band among the 5 sub-bands is interfered, the terminal may send the carrier frequency X of carrier A to the base station, and the identification information of the second sub-band. Thus, the base station may determine, according to the carrier frequency X, that carrier A in the 5G network used by the terminal is interfered, and accurately determine, according to the identification information of the second sub-band, that the second sub-band of carrier A is interfered. In this way, the specific frequency band that is interfered in the carrier may be accurately determined, so that the base station can accurately determine how to solve the in-device coexistence interference that exists or is about to occur in the terminal.

Corresponding to the foregoing embodiments of the in-device coexistence interference indication method and the in-device coexistence interference receiving method, the present disclosure also provides embodiments of an in-device coexistence interference indication apparatus and an in-device coexistence interference receiving apparatus.

Figure 16:
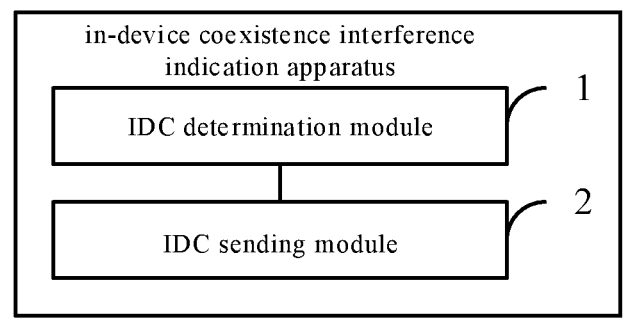
FIG. 16 is a schematic block diagram showing an in-device coexistence interference indication apparatus according to an embodiment of the present disclosure.

FIG. 16 is a schematic block diagram of an in-device coexistence interference indication apparatus according to an embodiment of the present disclosure. The in-device coexistence interference indication apparatus shown in an embodiment may be applied to a terminal such as mobile phone, tablet computer, wearable device, etc. The terminal may be used as a user equipment to communicate with a base station. Such communication with the base station may be based on 5G New Radio (NR). For example, the communication with the base station may be based on NR-U.

As shown in FIG. 16, the in-device coexistence interference indication apparatus may include: an IDC determination module 1, configured to determine that in-device coexistence interference IDC exists or is about to occur in the terminal, when the terminal is in an idle state or inactive state; and an IDC sending module 2, configured to send IDC indication information to a base station.

According to some embodiments, the IDC sending module is configured to send IDC indication information to the base station through a radio resource control RRC message.

According to some embodiments, the RRC message includes at least one of the following: RRC connection establishment request message, RRC connection resume request message, RRC connection establishment completion message, RRC connection resume completion message, IDC problem indication message, and user equipment assistance information report message.

Figure 17:
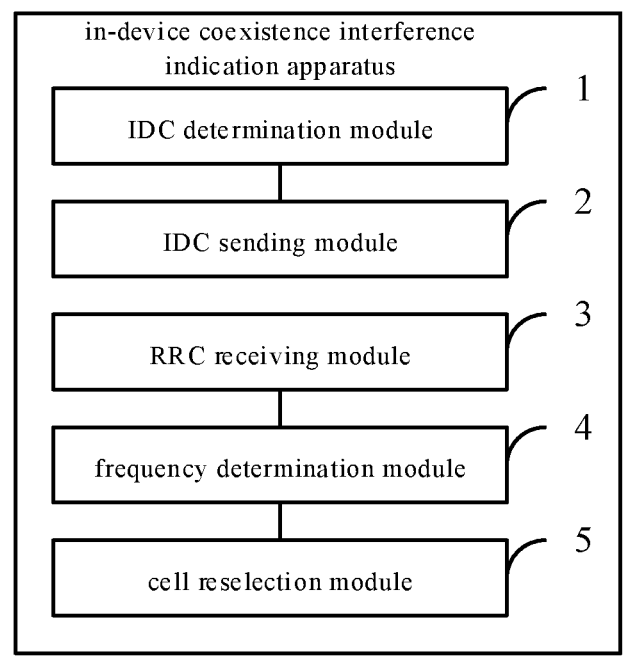
FIG. 17 is a schematic block diagram showing another in-device coexistence interference indication apparatus according to an embodiment of the present disclosure.

FIG. 17 is a schematic block diagram showing another in-device coexistence interference indication apparatus according to an embodiment of the present disclosure. As shown in FIG. 17, the RRC message is an RRC connection establishment request message or an RRC connection resume request message, and the apparatus further includes: a RRC receiving module 3, configured to receive an RRC connection rejection message or an RRC connection release message sent by the base station, where the RRC connection rejection message or the RRC connection release message includes first redirection information; a frequency determination module 4, configured to determine a first redirection frequency according to the first redirection information; and a cell reselection module 5, configured to access the cell corresponding to the first redirection frequency.

According to some embodiments, the RRC receiving module is configured to receive, in the idle state or in the inactive state, the RRC connection rejection message or the RRC connection release message sent by the base station, or receive, after entering the connected state, the RRC connection release message sent by the base station.

According to some embodiments, the first redirection information is a first redirection frequency.

According to some embodiments, the first redirection information is priority information of multiple frequencies, and the frequency determination module is configured to determine the first redirection frequency based on the priority information of the multiple frequencies and the priority of the frequency of the current cell.

According to some embodiments, the first redirection information is priority adjustment information, and the frequency determination module is configured to adjust the priority of the frequency of the current cell according to the priority adjustment information, and to determine the first redirection frequency according to the adjusted priority of the frequency of the current cell and the priorities of other frequencies.

Figure 18:
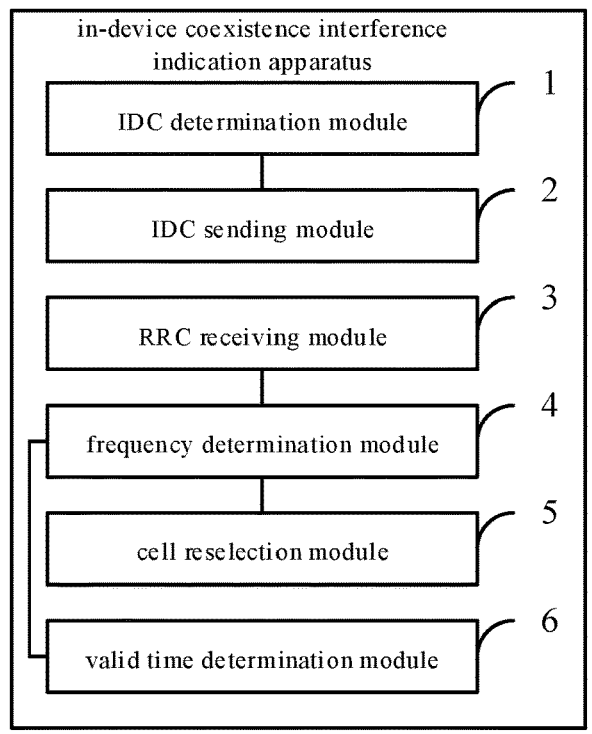
FIG. 18 is a schematic block diagram showing another in-device coexistence interference indication apparatus according to an embodiment of the present disclosure.

FIG. 18 is a schematic block diagram showing still another in-device coexistence interference indication apparatus according to an embodiment of the present disclosure. As shown in FIG. 18, the RRC connection establishment request message or the RRC connection resume request message is further used to indicate the valid time of the first redirection information, and the apparatus further includes: a valid time determination module 6, configured to determine the valid time of the first redirection information according to an RRC connection establishment request message or an RRC connection resume request message.

Besides, the frequency determination module 4 is further configured to determine the second redirection frequency according to the second redirection information in the system message of the current cell, in a case where the first redirection information is determined to be invalid according to the valid time.

Further, the cell reselection module 5 is also configured to access the cell corresponding to the second redirection frequency.

According to some embodiments, the IDC indication information further includes valid time suggestion information, and the valid time suggestion information is used for reference by the base station to determine the valid time of the first redirection information.

According to some embodiments, the RRC message is an IDC problem indication message or a user equipment assistance information report message. Besides, the IDC sending module is configured to send an RRC connection establishment request message or an RRC connection resume request message to the base station to enter a connected state; and to send, in the connected state, the IDC problem indication message or the user equipment assistance information report message to the base station.

Figure 19:
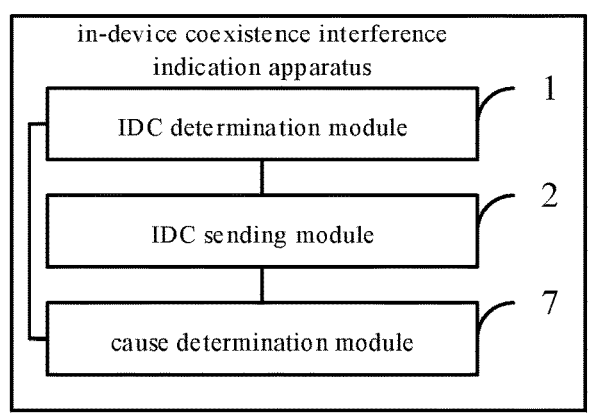
FIG. 19 is a schematic block diagram showing another in-device coexistence interference indication apparatus according to an embodiment of the present disclosure.

FIG. 19 is a schematic block diagram showing another coexistence interference indication apparatus according to an embodiment of the present disclosure. As shown in FIG. 19, the apparatus further includes: a cause determination module 7, configured to determine whether in-device coexistence interference IDC existing or being about to occur in the terminal is caused by a hardware sharing problem. Besides, the IDC sending module 2 is configured to send IDC indication information to the base station in a case where the IDC is caused by a hardware sharing problem.

Figure 20:
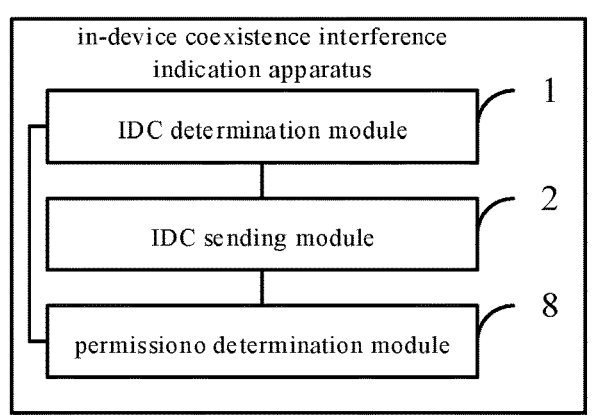
FIG. 20 is a schematic block diagram showing another in-device coexistence interference indication apparatus according to an embodiment of the present disclosure.

FIG. 20 is a schematic block diagram showing still another coexistence interference indication apparauts according to an embodiment of the present disclosure. As shown in FIG. 20, the apparauts further includes: a permission determination module 8, configured to determine whether the current cell is permitted to send IDC indication information to the base station in an idle state or inactive state. Besides, the IDC sending module 2 is configured to send IDC indication information to the base station when the current cell is permitted to send IDC indication information to the base station in an idle state or in an inactive state.

According to some embodiments, the IDC indication information further includes interference direction information.

According to some embodiments, the IDC indication information further includes IDC assistance information.

Figure 21:
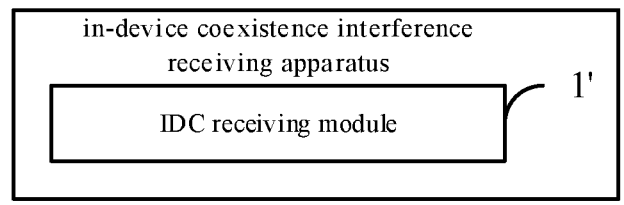
FIG. 21 is a schematic block diagram showing an in-device coexistence interference receiving apparatus according to an embodiment of the present disclosure.

FIG. 21 is a schematic block diagram of an in-device coexistence interference receiving apparatus according to an embodiment of the present disclosure. The in-device coexistence interference receiving apparatus shown in an embodiment may be applied to a base station. The base station may communicate with a terminal such as mobile phone, tablet, and wearable device. Such communication with the terminal may be based on 5G New Radio (NR). For example, the communication with the terminal may be based on NR-U.

As shown in FIG. 21, the in-device coexistence interference receiving apparatus may include: an IDC receiving module 1', configured to receive IDC indication information sent by a terminal in an idle state or inactive state.

According to some embodiments, the IDC indication information is contained in an RRC message.

According to some embodiments, the RRC message includes at least one of the following: RRC connection establishment request message, RRC connection resume request message, RRC connection establishment completion message, RRC connection resume completion message, IDC problem indication message, and user equipment assistance information report message.

Figure 22:
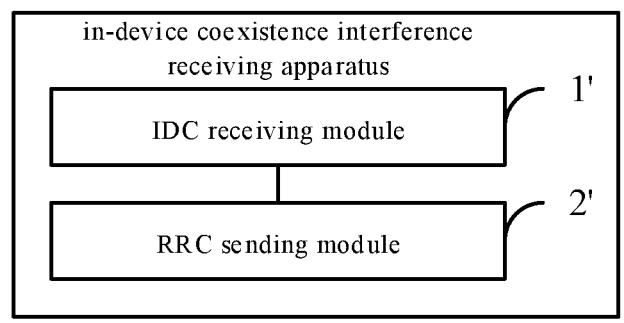
FIG. 22 is a schematic block diagram showing another in-device coexistence interference receiving apparatus according to an embodiment of the present disclosure.

FIG. 22 is a schematic block diagram of another in-device coexistence interference receiving apparatus according to an embodiment of the present disclosure. As shown in FIG. 22, the RRC message is an RRC connection establishment request message or an RRC connection resume request message, and the apparatus further includes: a RRC sending module 2', configured to send an RRC connection rejection message or an RRC connection release message to the terminal, where the RRC connection rejection message or the RRC connection release message contains the first redirection information, and the first redirection information is used to instruct the terminal to perform cell reselection.

According to some embodiments, the RRC sending module is configured to send, to the terminal in the idle state or in the inactive state, an RRC connection rejection message or an RRC connection release message sent by the base station. Alternatively, the RRC sending module is configured to send, to the terminal after entering the connected state, an RRC connection release message sent by the base station.

According to some embodiments, the first redirection information is a first redirection frequency.

According to some embodiments, the first redirection information is priority information of multiple frequencies.

According to some embodiments, the first redirection information is priority adjustment information.

According to some embodiments, the RRC connection establishment request message or the RRC connection resume request message is further used to indicate the valid time of the first redirection information.

Figure 23:
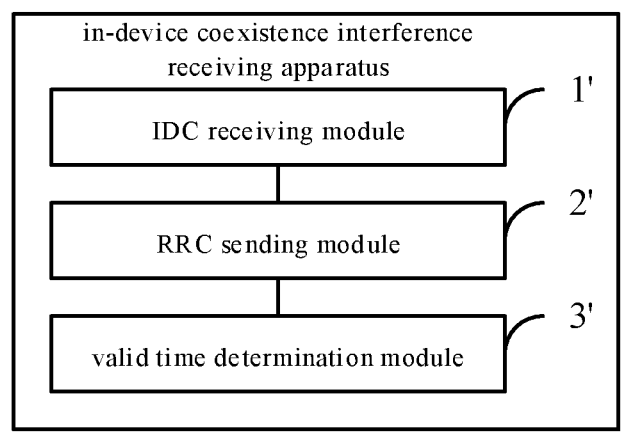
FIG. 23 is a schematic block diagram showing another in-device coexistence interference receiving apparatus according to an embodiment of the present disclosure.

FIG. 23 is a schematic block diagram of another in-device coexistence interference receiving apparatus according to an embodiment of the present disclosure. As shown in FIG. 23, the IDC indication information further includes valid time suggestion information, and the apparatus further includes: a valid time determination module 3', configured to determine the valid time of the first redirection information according to the valid time suggestion information.

According to some embodiments, the RRC message is an IDC problem indication message or a user equipment assistance information report message. Besides, the IDC receiving module is configured to receive an RRC connection establishment request message or an RRC connection resume request message sent by the terminal; perform RRC connection establishment or RRC connection resume on the terminal; and receive the IDC problem indication message or the user equipment assistance information report message sent by the terminal in the connected state.

According to some embodiments, the IDC indication information further includes interference direction information.

According to some embodiments, the IDC indication information further includes IDC assistance information.

Regarding the apparatus in the foregoing embodiments, the specific ways in which each module performs respective operations have been described in detail in embodiments of the related method, and will not be elaborated here.

As for apparatus embodiments, they basically correspond to the method embodiments, and thus the part of the description about the method embodiments for related parts may be referred to. The apparatus embodiments described above are merely illustrative. The modules described as separate components may or may not be physically separated, and the components displayed as modules may or may not be physical modules. That is, they may be located in one place, or distributed over multiple network modules. Some or all of the modules may be selected according to actual needs to achieve the objectives of the solutions in embodiments of the present disclosure. Those of ordinary skill in the art may understand and implement in this regard without any creative work.

An embodiment of the present disclosure also proposes an electronic device, including: a processor; and a memory for storing processor executable instructions. The processor is configured to implement the in-device coexistence interference indication method described in any of the foregoing embodiments.

An embodiment of the present disclosure also proposes an electronic device, including: a processor; and a memory for storing processor executable instructions. The processor is configured to implement the in-device coexistence interference receiving method described in any of the foregoing embodiments.

An embodiment of the present disclosure also proposes a computer-readable storage medium on which a computer program is stored. When the computer program is executed by a processor, the steps in the in-device coexistence interference indication method described in any of the foregoing embodiments are implemented.

An embodiment of the present disclosure also proposes a computer-readable storage medium on which a computer program is stored. When the computer program is executed by a processor, the steps in the in-device coexistence interference receiving method described in any of the above embodiments are implemented.

Figure 24:
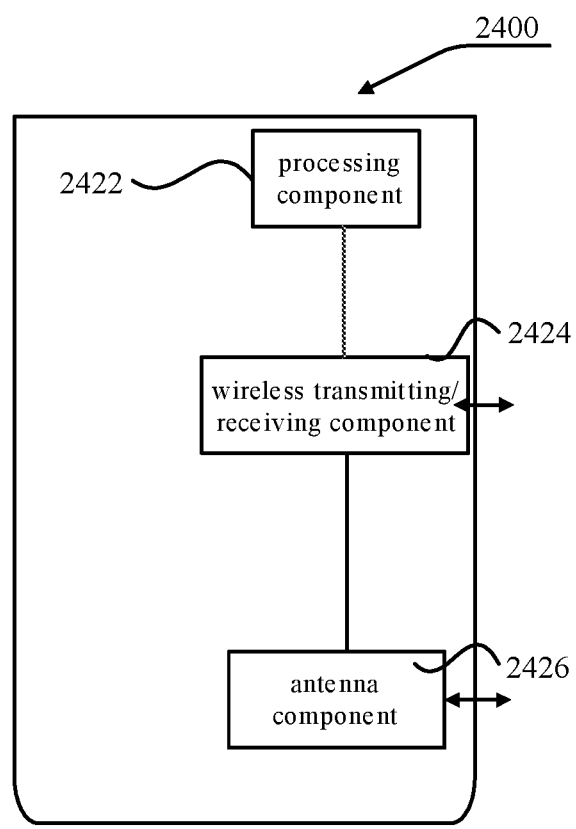
FIG. 24 is a schematic block diagram showing an in-device coexistence interference receiving apparatus according to an embodiment of the present disclosure.

As shown in FIG. 24, FIG. 24 is a schematic block diagram of an in-device coexistence interference receiving apparatus 2400 according to an embodiment of the present disclosure. The apparatus 2400 may be provided as a base station 24. With reference to FIG. 24, the apparatus 2400 includes a processing component 2422, a wireless transmitting/receiving component 2424, an antenna component 2426, and a signal processing component specific to a wireless interface. The processing component 2422 may further include one or more processors. One of the processors in the processing component 1522 may be configured to implement the in-device coexistence interference receiving method described in any of the foregoing embodiments.

Figure 25:
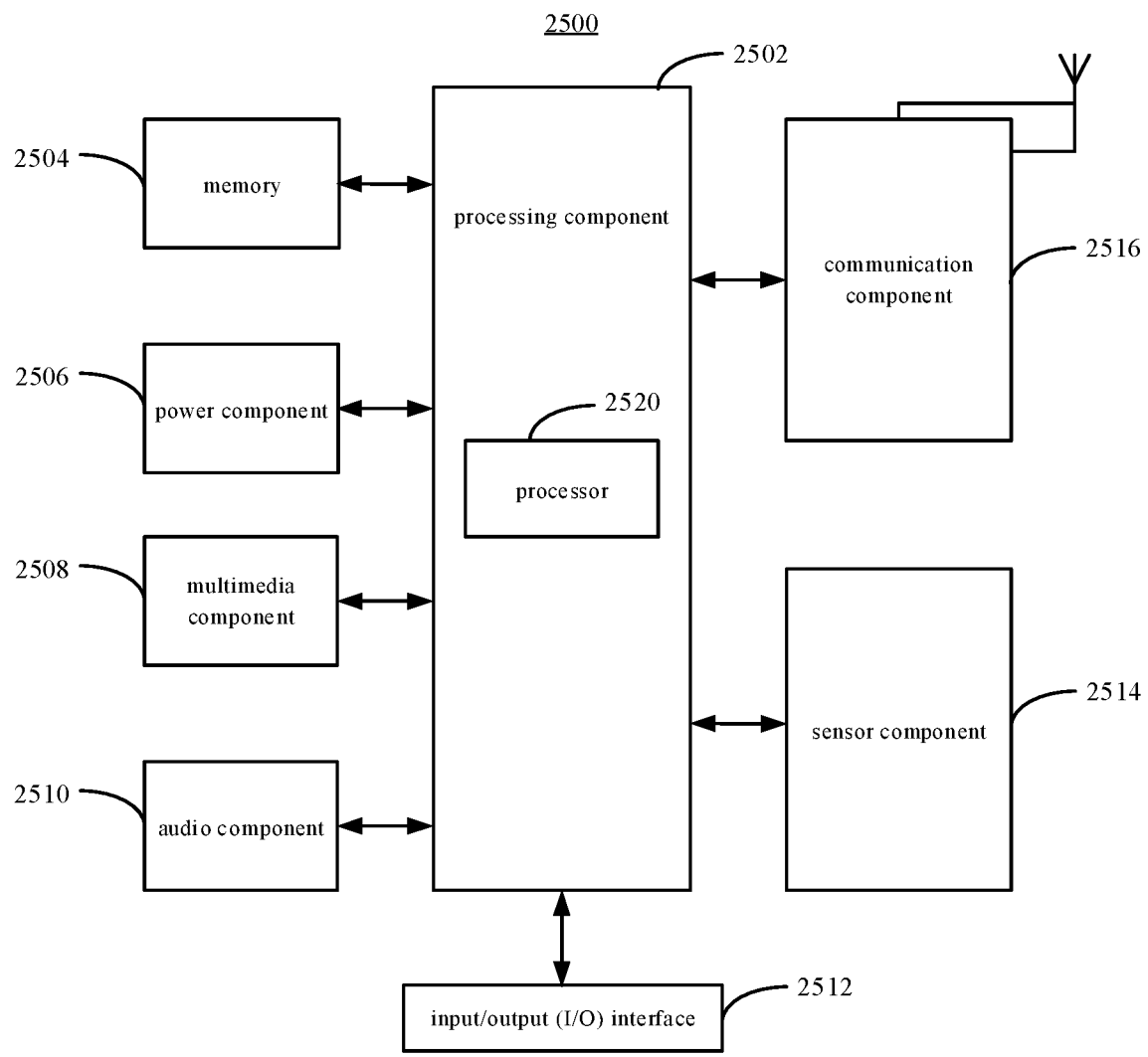
FIG. 25 is a schematic block diagram showing an in-device coexistence interference receiving apparatus according to an embodiment of the present disclosure.

FIG. 25 is a schematic block diagram of an in-device coexistence interference indication apparatus 2500 according to an embodiment of the present disclosure. For example, the apparatus 2500 may be a mobile phone, a computer, a digital broadcast terminal, a messaging device, a game console, a tablet device, a medical device, a fitness device, a personal digital assistant, etc.

Referring to FIG. 25, the apparatus 2500 may include one or more of the following components: a processing component 2502, a memory 2504, a power component 2506, a multimedia component 2508, an audio component 2510, an input/output (I/O) interface 2512, a sensor component 2514, and a communication component 2516.

The processing component 2502 generally controls the overall operations of the apparatus 2500, such as operations associated with display, telephone calls, data communications, camera operations, and recording operations. The processing component 2502 may include one or more processors 2520 to execute instructions, so as to complete all or part of the steps of the foregoing methods. In addition, the processing component 2502 may include one or more modules to facilitate the interaction between the processing component 2502 and other components. For example, the processing component 2502 may include a multimedia module to facilitate the interaction between the multimedia component 2508 and the processing component 2502.

The memory 2504 is configured to store various types of data to support operations on the apparatus 2500. Examples of these data include instructions for any application or method operating on the apparatus 2500, contact data, phone book data, messages, pictures, videos, etc. The memory 2504 may be implemented by any type of volatile or non-volatile storage device or their combinations, such as static random access memory (SRAM), electrically erasable programmable read-only memory (EEPROM), erasable and programmable read-only memory (EPROM), programmable read-only memory (PROM), read-only memory (ROM), magnetic memory, flash memory, magnetic disk, or optical disk.

The power component 2506 provides power to various components of the apparatus 2500. The power component 2506 may include a power management system, one or more power supplies, and other components associated with the generation, management, and distribution of power for the apparatus 2500.

The multimedia component 2508 includes a screen that provides an output interface between the apparatus 2500 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gesture on the touch panel. The touch sensor may not only sense the boundary of a touch or sliding operation, but also detect the duration and pressure related to the touch or sliding operation. In some embodiments, the multimedia component 2508 includes a front camera and/or a rear camera. When the apparatus 2500 is in an operation mode, such as a shooting mode or a video mode, the front camera and/or the rear camera may receive external multimedia data. Each of the front camera and the rear camera may be a fixed optical lens system or have a focal length and optical zooming capability.

The audio component 2510 is configured to output and/or input audio signals. For example, the audio component 2510 includes a microphone (MIC). When the apparatus 2500 is in an operation mode, such as a call mode, a recording mode, and a voice recognition mode, the microphone is configured to receive external audio signals. The received audio signal may be further stored in the memory 2504 or transmitted via the communication component 2516. In some embodiments, the audio component 2510 further includes a speaker for outputting audio signals.

The I/O interface 2512 provides an interface between the processing component 2502 and a peripheral interface module. The above-mentioned peripheral interface module may be a keyboard, a click wheel, a button, and so on. These buttons may include but are not limited to a home button, a volume button, a start button, and a lock button.

The sensor component 2514 includes one or more sensors for providing the apparatus 2500 with various aspects of status assessment. For example, the sensor component 2514 may detect the on/off status of the apparatus 2500 and the relative positioning among components. For example, these component may be the display and the keypad of the apparatus 2500. The sensor component 2514 may further detect the position change of the apparatus 2500 or of a component in the apparatus 2500, the presence or absence of contact between the user and the apparatus 2500, the orientation or acceleration/deceleration of the apparatus 2500, and the temperature change of the apparatus 2500. The sensor component 2514 may include a proximity sensor, configured to detect the presence of nearby objects when no physical contact exists. The sensor component 2514 may further include a light sensor, such as a CMOS or CCD image sensor, for use in imaging applications. In some embodiments, the sensor component 2514 may further include an acceleration sensor, a gyroscope sensor, a magnetic sensor, a pressure sensor, or a temperature sensor.

The communication component 2516 is configured to facilitate wired or wireless communication between the apparatus 2500 and other devices. The apparatus 2500 may access a wireless network based on a communication standard, such as WiFi, 2G or 3G, 4G LTE, 5G NR, or a combination thereof. In an exemplary embodiment, the communication component 2516 receives a broadcast signal or broadcast related information from an external broadcast management system via a broadcast channel. In an exemplary embodiment, the communication component 2516 further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology, and other technologies.

In an exemplary embodiment, the apparatus 2500 may be implemented by one or more application specific integrated circuits (ASICs), digital signal processors (DSP), digital signal processing devices (DSPD), programmable logic devices (PLD), a field programmable gate array (FPGA), a controller, a microcontroller, a microprocessor, or other electronic components, so as to implement the in-device coexistence interference indication method described in any of the foregoing embodiments.

In an exemplary embodiment, there is also provided a non-transitory computer-readable storage medium containing instructions, such as a memory 2504 containing instructions. The foregoing instructions may be executed by the processor 2520 of the apparatus 2500 to complete the foregoing methods. For example, the non-transitory computer-readable storage medium may be ROM, random access memory (RAM), CD-ROM, magnetic tape, floppy disk, optical data storage device, etc.

After considering the specification and practicing the present disclosure disclosed herein, those skilled in the art will easily think of other embodiments of the present disclosure. The present disclosure is intended to cover any variations, uses, or adaptive changes of the present disclosure. These variations, uses, or adaptive changes follow the general principle of the present disclosure and include common knowledge or conventional technical means in the technical field that are not disclosed in the present disclosure. The description and the embodiments are to be regarded as exemplary only.

It should be understood that the present disclosure is not limited to the precise structures that have been described above and shown in the drawings, and various modifications and changes may be made without departing from its scope.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

It should be noted that in the present disclosure, relational terms such as first and second are only used to distinguish one entity or operation from another entity or operation, and do not necessarily require or imply that any such actual relationship or sequence exists between these entities or operations. The terms "include", "including" or any other variants thereof are intended to cover non-exclusive inclusion, so that a process, method, article or apparatus including a series of elements not only includes those elements, but also includes other elements that are not explicitly listed, or elements inherent to such process, method, article, or apparatus. If there are no more restrictions, the element defined by the sentence "including a . . . " does not exclude the existence of other identical elements in the process, method, article, or apparatus that includes the element.

The method and apparatus provided in embodiments of the present disclosure are described in detail above. Specific examples are used in the present disclosure to illustrate the principle and implementations of the present disclosure. The description of the above embodiments is only used to help understanding the method of the present disclosure and its essential concept. At the same time, for those of ordinary skill in the art, according to the idea of the present disclosure, changes may be made in the specific implementations and the scope of present disclosure. In summary, the content of the present specification should not be construed as a limitation to the present disclosure.

The invention claimed is:

1. A method for in-device coexistence interference indication, applied to a terminal, and comprising:
   determining, when the terminal is in an idle state or inactive state, that in-device coexistence interference (IDC) exists or is about to occur in the terminal; and
   sending IDC indication information to a base station,
   wherein sending the IDC indication information to the base station comprises:
   sending the IDC indication information to the base station through a radio resource control (RRC) message;
   wherein the RRC message comprises IDC problem indication message; and
   wherein the IDC problem indication message indicates whether the IDC is caused by hardware sharing problems.

2. The method according to claim 1, wherein the RRC message further comprises at least one of:
   RRC connection establishment request message;
   RRC connection resume request message;
   RRC connection establishment completion message;
   RRC connection resume completion message;
   or
   user equipment assistance information report message.

3. The method according to claim 2, wherein
   the RRC message further comprises the RRC connection establishment request message or the RRC connection resume request message, and
   the method further comprises:
   receiving an RRC connection rejection message or an RRC connection release message sent by the base station, wherein the RRC connection rejection message or the RRC connection release message comprises first redirection information;
   determining a first redirection frequency according to the first redirection information; and
   accessing a cell corresponding to the first redirection frequency.

4. The method according to claim 3, wherein receiving the RRC connection rejection message or the RRC connection release message sent by the base station comprises:
   receiving, in an idle state or an inactive state, the RRC connection rejection message or the RRC connection release message sent by the base station, or
   receiving, after entering a connected state, the RRC connection release message sent by the base station.

5. The method according to claim 3, wherein
   the first redirection information comprises priority information of multiple frequencies, and
   determining the first redirection frequency according to the first redirection information comprises:
   determining the first redirection frequency according to the priority information of the multiple frequencies and a priority of a frequency of a current cell.

6. The method according to claim 3, wherein
   the first redirection information comprises priority adjustment information, and
   determining the first redirection frequency according to the first redirection information comprises:
   adjusting a priority of a frequency of a current cell according to the priority adjustment information; and
   determining the first redirection frequency according to an adjusted priority of the frequency of the current cell and priorities of other frequencies.

7. The method according to claim 3, wherein
   the RRC connection establishment request message or the RRC connection resume request message indicates a valid time of the first redirection information, and
   the method further comprises:
   determining the valid time of the first redirection information according to the RRC connection establishment request message or the RRC connection resume request message;
   determining a second redirection frequency according to second redirection information in a system message of a current cell, in response that the first redirection information is determined to be invalid according to the valid time; and
   accessing a cell corresponding to the second redirection frequency.

8. The method according to claim 3, wherein
   the IDC indication information further comprises valid time suggestion information, and
   the valid time suggestion information is configured for use by the base station to determine a valid time of the first redirection information.

9. The method according to claim 1, wherein
   sending the IDC indication information to the base station comprises:

sending an RRC connection establishment request message or an RRC connection resume request message to the base station to enter a connected state; and sending, in the connected state, the IDC problem indication message to the base station.

10. An in-device coexistence interference receiving method, applied to a base station, and comprising:

receiving IDC indication information sent by a terminal in an idle state or inactive state, wherein the IDC indication information is contained in an RRC message;

wherein the RRC message comprises IDC problem indication message; and wherein the IDC problem indication message indicates whether the IDC is caused by hardware sharing problems.

11. The method according to claim 10, wherein the RRC message further comprises at least one of:

RRC connection establishment request message, RRC connection resume request message, RRC connection establishment completion message, RRC connection resume completion message, and user equipment assistance information report message.

12. The method according to claim 11, wherein the RRC message further comprises the RRC connection establishment request message or the RRC connection resume request message, and the method further comprises:

sending an RRC connection rejection message or an RRC connection release message to the terminal, wherein the RRC connection rejection message or the RRC connection release message comprises first redirection information, and the first redirection information is configured to instruct the terminal to perform cell reselection.

13. The method according to claim 12, wherein the sending the RRC connection rejection message or the RRC connection release message to the terminal comprises:

sending, to the terminal in an idle state or inactive state, the RRC connection rejection message or the RRC connection release message, or sending, to the terminal in a connected state, the RRC connection release message.

14. The method according to claim 12, wherein the RRC connection establishment request message or the RRC connection resume request message indicates a valid time of the first redirection information.

15. The method according to claim 12, wherein the IDC indication information further comprises valid time suggestion information, and the method further comprises:

determining a valid time of the first redirection information according to the valid time suggestion information, before receiving the IDC indication information sent by the terminal in an idle state or inactive state.

16. The method according to claim 10, wherein receiving the IDC indication information sent by the terminal in the idle state or the inactive state comprises:

receiving an RRC connection establishment request message or an RRC connection resume request message sent by the terminal;

performing RRC connection establishment or RRC connection resume on the terminal; and receiving the IDC problem indication message sent by the terminal in a connected state.

17. An electronic device, comprising:

a processor; and a memory, configured to store processor executable instructions, wherein the processor is configured to implement a method for in-device coexistence interference indication, applied to a terminal, and comprising:

determining, when the terminal is in an idle state or inactive state, that in-device coexistence interference IDC exists or is about to occur in the terminal; and sending IDC indication information to a base station, wherein sending the IDC indication information to the base station comprises:

sending the IDC indication information to the base station through a radio resource control (RRC) message;

wherein the RRC message comprises IDC problem indication message; and wherein the IDC problem indication message indicates whether the IDC is caused by hardware sharing problems.

18. An electronic device, comprising:

a processor; and a memory, configured to store processor executable instructions, wherein the processor is configured to implement the in-device coexistence interference receiving method according to claim 10.

* * * * *